United States Patent
Kashyap et al.

(10) Patent No.: US 10,470,074 B2
(45) Date of Patent: Nov. 5, 2019

(54) THERMAL-BASED RADIO SELECTION

(71) Applicant: QUALCOMM Incorporated, San Diego, CA (US)

(72) Inventors: Rahul Kashyap, San Diego, CA (US); Mahesh Kommi, San Diego, CA (US); Kwangyoon Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 25 days.

(21) Appl. No.: 15/655,723

(22) Filed: Jul. 20, 2017

(65) Prior Publication Data

US 2019/0028916 A1 Jan. 24, 2019

(51) Int. Cl.
| | |
|---|---|
| *H04W 4/00* | (2018.01) |
| *H04W 28/02* | (2009.01) |
| *H04W 72/04* | (2009.01) |
| *H04L 12/911* | (2013.01) |
| *H04W 88/06* | (2009.01) |
| *H04Q 9/00* | (2006.01) |
| *H04W 72/02* | (2009.01) |
| *H04W 28/08* | (2009.01) |

(52) U.S. Cl.
CPC ..... *H04W 28/0221* (2013.01); *H04W 72/048* (2013.01); *H04L 47/824* (2013.01); *H04Q 9/00* (2013.01); *H04Q 2209/40* (2013.01); *H04W 28/08* (2013.01); *H04W 72/02* (2013.01); *H04W 88/06* (2013.01)

(58) Field of Classification Search
CPC . H04W 88/06; H04W 28/10; H04W 36/0005; H04W 52/0251; H04W 52/244; H04W 72/02; H04W 72/042; H04W 72/082; H04W 72/1215; H04W 72/1278; H04W 52/143
See application file for complete search history.

(56) References Cited

U.S. PATENT DOCUMENTS

| | | | |
|---|---|---|---|
| 7,206,567 B2* | 4/2007 | Jin | H04M 1/677 455/404.1 |
| 8,675,615 B2 | 3/2014 | Anderson et al. | |
| 8,750,926 B2* | 6/2014 | Fu | H04B 1/406 455/553.1 |
| 2006/0270385 A1* | 11/2006 | Morris | H04W 52/0203 455/405 |
| 2010/0273431 A1 | 10/2010 | Fraser et al. | |
| 2010/0285828 A1 | 11/2010 | Panian et al. | |
| 2013/0273857 A1* | 10/2013 | Zhang | H04B 15/00 455/73 |

(Continued)

*Primary Examiner* — Sai Aung
(74) *Attorney, Agent, or Firm* — Patterson & Sheridan, L.L.P.

(57) ABSTRACT

Various additional and alternative aspects are described herein. In some aspects, the present disclosure provides a wireless device. The wireless device includes a first radio configured to communicate with a first data network. The wireless device includes a second radio configured to communicate with a second data network. The wireless device includes a thermal sensor array configured to measure a set of one or more thermal parameters associated with the wireless device. The wireless device includes a controller configured to allocate communication of data traffic between the first radio and the second radio based on the set of one or more thermal parameters.

15 Claims, 6 Drawing Sheets

(56) References Cited

U.S. PATENT DOCUMENTS

| | | | |
|---|---|---|---|
| 2015/0011211 A1* | 1/2015 | Plestid | H04W 36/24 |
| | | | 455/436 |
| 2015/0031326 A1 | 1/2015 | Begin et al. | |
| 2015/0105122 A1* | 4/2015 | Wei | H04W 24/04 |
| | | | 455/553.1 |
| 2015/0119068 A1 | 4/2015 | Kudekar et al. | |
| 2017/0064037 A1 | 3/2017 | Das et al. | |

* cited by examiner

THERMAL-BASED RADIO SELECTION

FIELD

The present disclosure relates generally to wireless communication, and more particularly, to allocating communication of data traffic among a plurality of radios in a wireless device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some examples, a wireless communication system may include a number of access points (APs) or base stations (BSs), each simultaneously supporting communication for multiple communication devices, otherwise known as user equipment (UEs). In certain aspects, the UEs may include multiple radios for communicating with a data network (e.g., multiple radios for communicating with the same data network, such as the Internet or a service provider network). The different radios may use different technologies for communicating with the data network. For example, a radio may use a wireless wide area network (WWAN) technology, such as cellular technologies (e.g., LTE, MuLTEFire, 5G, new radio (NR), etc.). In another example, a radio may use a wireless local area network (WLAN) technology, such as WiFi technologies (e.g., IEEE 802.11). (Further, different radio technologies may utilize licensed or unlicensed spectrum for communications. Accordingly, techniques for allocating communication of data traffic among the multiple radios for communicating with the data network may be desirable.

SUMMARY

Certain aspects of the present disclosure provide a wireless device. The wireless device includes a first radio configured to communicate with a first data network. The wireless device includes a second radio configured to communicate with a second data network. The wireless device includes a thermal sensor array configured to measure a set of one or more thermal parameters associated with the wireless device. The wireless device includes a controller configured to allocate communication of data traffic between the first radio and the second radio based on the set of one or more thermal parameters.

Certain aspects of the present disclosure provide a method for communicating in one or more data networks. The method includes determining a set of one or more thermal parameters associated with a wireless device. The method includes allocating communication of data traffic between a first radio and a second radio of the wireless device based on the set of one or more thermal parameters.

Certain aspects of the present disclosure provide a wireless device. The wireless device includes first means for communicating with a first data network. The wireless device includes second means for communicating with a second data network. The wireless device includes means for determining a set of one or more thermal parameters associated with the wireless device. The wireless device includes means for allocating communication of data traffic between the first means for communicating and the second means for communicating based on the set of one or more thermal parameters.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
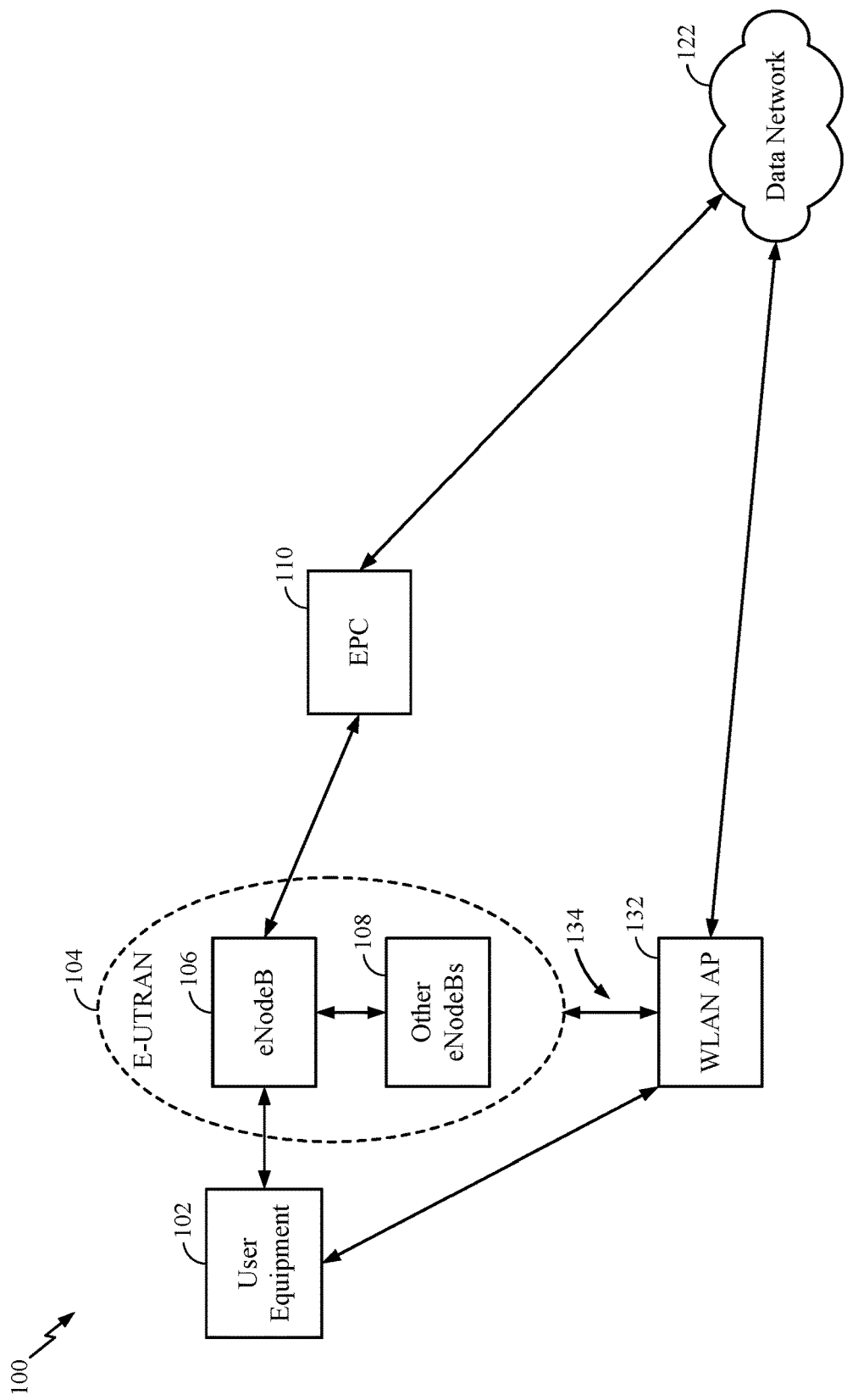
FIG. 1 is a diagram illustrating an example of a network architecture.

Certain networks may be accessible by a UE using multiple different radio technologies (e.g., by using multiple different paths for accessing the networks). For example, the Internet, or other data networks, may be accessible via a WLAN, such as via WLAN APs that are coupled to the WLAN. Further, the Internet, or other data networks, may be accessible via a WWAN, such as via WWAN APs (e.g., evolved Node Bs (eNBs)) that are coupled to the WWAN. In certain aspects, a UE may access the same network separately (e.g., in time) using different radios for the different radio technologies. In certain aspects, a UE may simultaneously access the same network using different radios for the different radio technologies. In certain aspects, a UE may access different networks using different radios either separately or simultaneously.

For example, LTE-WLAN aggregation (LWA) provides data aggregation at the radio access network where an eNB schedules packets to be served on LTE and WiFi radio links to a UE. Accordingly, a UE can access a data network using both a WWAN (e.g., LTE) radio and a WLAN (e.g., WiFi) radio simultaneously. The advantage of such a simultaneous access solution is that it may provide better control and utilization of resources on both links. This can increase the aggregate throughput for all users and improve the total system capacity by better managing the radio resources among users.

Accessing a data network via one radio technology may be preferred over accessing the data network via another radio technology for one or more reasons, such as cost. For example, accessing a data network using a radio technology such as a WLAN radio technology or a radio technology that utilizes unlicensed spectrum for communication may be preferred over using a radio technology such as a WWAN radio technology or a radio technology that utilizes licensed spectrum for communication due to lower costs of the WLAN radio technology or a radio technology that utilizes unlicensed spectrum. Accordingly, in certain aspects, the UE may prioritize use of a WLAN radio for accessing the data network over the use of a WWAN radio. Therefore, the UE may allocate that more traffic be communicated over the WLAN radio (e.g., all traffic, a higher percentage of traffic, etc.) than over the WWAN radio (e.g., no traffic, lower percentage of traffic, etc.) when the WLAN is available via the WLAN radio.

However, allocating communication of traffic between multiple radios solely based on certain parameters such as cost, throughput, etc., may lead to thermal or power consumption issues at the UE. For example, while use of a WLAN radio may be preferred over use of a WWAN radio due to cost, the WLAN radio may consume more power to operate than the WWAN radio. Further, the WLAN radio may generate more heat than the WWAN radio. In certain aspects, a UE has a thermal design threshold and corresponding thermal mitigation techniques, where if the temperature rises above a threshold, then the data rates of the UE may be throttled, leading to a poor user experience.

It should be noted that, though certain aspects are described herein as allocating communication of data traffic between a WLAN radio for communicating in a WLAN with a data network and a WWAN radio for communicating in a WWAN with the data network, it should be understood that the same principles may be applied for allocating communication of data traffic between any number of radios of any type of radio technology for accessing the data network. Further, though certain aspects are described herein as allocating communication of data traffic between multiple radios for communication with the same data network, it should be understood that the same principles may be applied for allocating communication of data traffic between multiple radios for accessing different data networks via the radios.

Accordingly (e.g., to mitigate thermal issues at the UE), certain aspects herein relate to allocating communication of data traffic with one or more data networks among multiple radios based on one or more thermal parameters (e.g., one or more temperatures or measurements related to temperature, such as surface temperature, junction temperature, skin temperature, radio temperature, etc.) associated with the UE. For example, the UE may include a thermal sensor array comprising one or more thermal sensors positioned in one or more locations within the UE (e.g., one or more thermal sensors proximate to each of one or more of radios, one or more thermal sensors proximate to one or more locations on an outer surface of the UE, etc.). Each sensor of the thermal sensor array may be configured to measure one or more thermal parameters. In certain aspects, the UE is configured to determine one or more radios to use based on the set of one or more thermal parameters measured by the thermal sensor array as further discussed herein. For example, the UE may allocate portions of data traffic among the radios based on the thermal parameter measurements.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functions described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, optical disk storage, magnetic disk storage or other magnetic storage devices, or any other medium that can be used to carry or store desired program code in the form of instructions or data structures and that can be accessed by a computer.

FIG. 1 is a block diagram illustrating an exemplary network architecture 100 in which aspects of the present disclosure may be practiced.

The network architecture 100 may include one or more user equipment (UE) 102, an LTE Evolved UMTS Terrestrial Radio Access Network (E-UTRAN) 104, an Evolved Packet Core (EPC) 110, and a data network 122 (e.g., the Internet).

The LTE E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access to the EPC 110 for a UE 102. EPC 110 may further provide access to data network 122 for the UE 120. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology The network architecture 100 may further include one or more Wireless Local Area Network (WLAN) Access Points (APs) (e.g., WLAN AP 132). The UE 102 supports dual connectivity to the LTE and WLAN Radio Access Technologies (RATs). The UE 102 comprises a first radio and a second radio (not shown) and is capable of accessing the data network 122 (i) via the WLAN AP 132 using the first radio and/or (ii) via the eNB 106 using the second radio. In certain aspects, the UE 102 may be LWA capable and may be connected to the EPC 110 via the eNB (e.g, eNBs 106, 108) and the WLAN AP 132, and may aggregate data in LWA configuration to achieve higher data rates and load balancing between the two RATs. As shown each of the eNBs 106 and 108 and may be connected to the WLAN AP 132 via a backhaul link 134. An eNB 106 or 108 and the WLAN AP 132 may exchange control information and traffic over the backhaul link 134 to implement and maintain the LWA operation. For example, information may be exchanged by the eNB 106 or 108 and WLAN AP 132 to split data traffic between the two paths (e.g., UE-eNB and UE-AP paths) to increase the aggregate data rate and further for load balancing purpose. For example, the UE 102 in LWA configuration may access data network 122 via the eNB 106 and the WLAN AP 132 simultaneously or concurrently. In certain aspects, each of the eNBs 106 and 108 and may not be connected to the WLAN AP 132 via a backhaul link 134, and may not operate in a LWA configuration. For example, the UE 102 may access data network 122 through either eNBs 106, 108, or WLAN AP 132 without implementing LWA.

Example Techniques for Thermal-Driven Radio Selection

As discussed, certain aspects herein relate to allocating communication of data traffic with a data network among multiple radios of a UE based on one or more thermal parameters associated with the UE.

Figure 2:
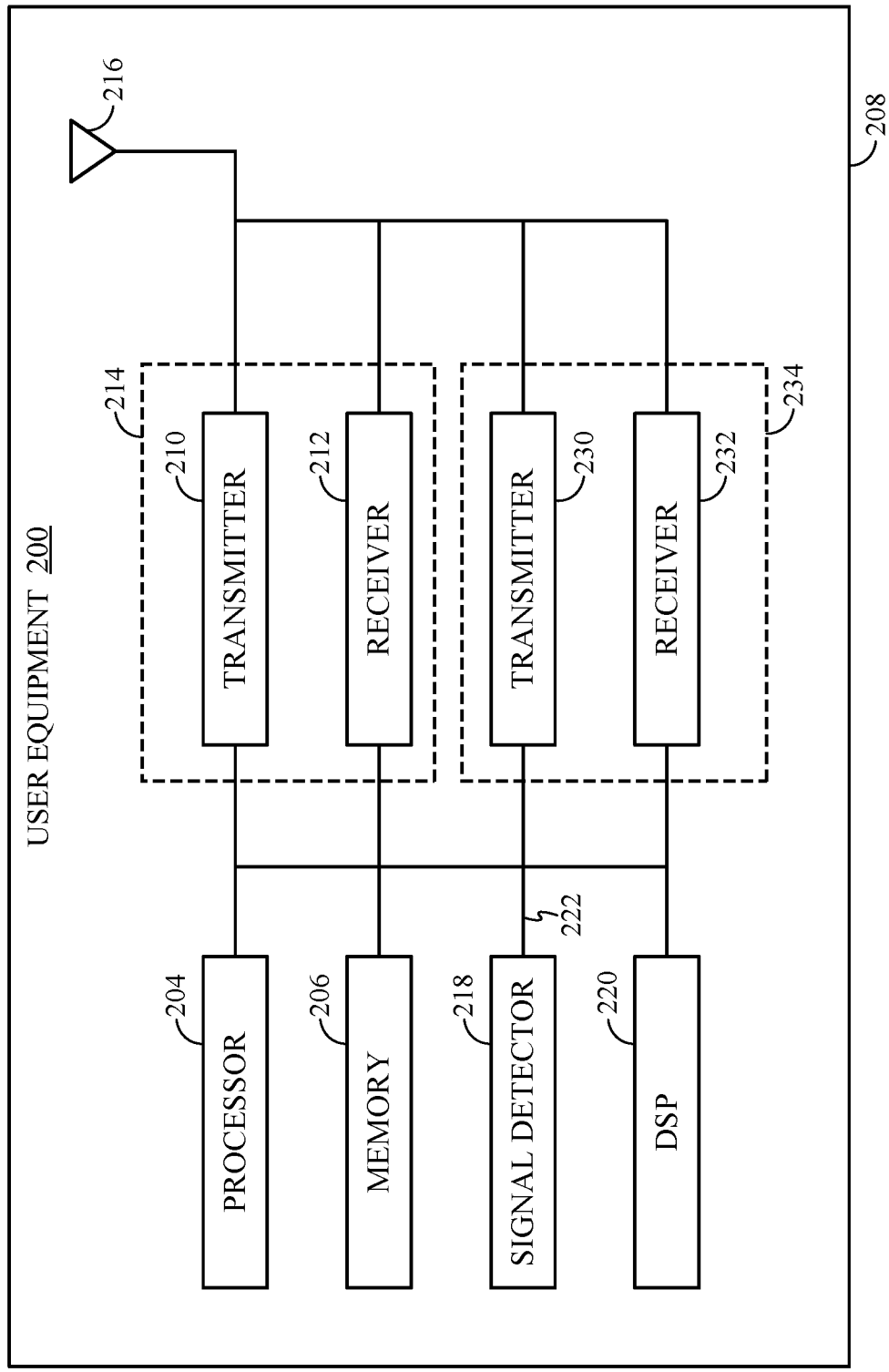
FIG. 2 is a simplified block diagram of an example of a user equipment (UE), in accordance with certain aspects of the present disclosure.

FIG. 2 is a simplified block diagram of a UE 200. The UE 200 may correspond to UE 102 described herein. The UE 200 is an example of a device that may be configured to implement the various systems and methods described herein.

In certain aspects, the UE 200 includes a processor 204 which controls operation of the UE 200. The processor 204 may also be referred to as a central processing unit (CPU). Memory 206, which may include both read-only memory (ROM) and random access memory (RAM), provides instructions and data to the processor 204. The processor 204 typically performs logical and arithmetic operations based on program instructions stored within the memory 206. The instructions in the memory 206 may be executable to implement the methods described herein.

The UE 200 also includes a housing 208 and includes a radio 214 (e.g., configured to act as a transceiver). The radio 214 includes a transmitter 210 and a receiver 212 to allow transmission and reception of data between the UE 200 and a remote location. An antenna 216 may be electrically coupled to the radio 214. In certain aspects, antenna 216 is included in housing 208 as shown. Alternatively, antenna 216 may be outside of housing 208 (e.g., attached to housing 208). Further, though only a single antenna 216 is shown as coupled to radio 214, radio 214 may be coupled to additional antennas. For example, each of transmitter 210 and receiver 212 may be coupled to separate antennas.

The UE further includes another radio 234 including transmitter 230 and receiver 232 to allow transmission and reception of data between the UE 200 and a remote location. Radio 234 may additionally be coupled to the same antenna(s) as radio 214 (e.g., antenna 216) or additional antennas. 2For example, radio 214 and radio 234 may share antenna 216 (e.g., in a time multiplexed fashion). The UE 200 may also include (not shown) additional transmitters, receivers, and radios.

In certain aspects, radio 214 and radio 234 (and any additional radios) are separate components. Further, radio 214 and radio 234 (and any additional radios) may be positioned in different locations in the housing 208. For example, each radio may be placed in any position in the housing 208. Further, a separation distance between a pair of radios may be anywhere between a minimum separation where the radios are positioned next to each other to a maximal separation wherein the radios are positioned at opposite sides or corners of the housing 208.

In certain aspects, radio 214 supports a different radio technology than radio 234 as described herein. For example, radio 214 may be a WWAN radio and radio 234 may be a WLAN radio. In certain aspects, UE 200 is capable of communicating with the same data network via either the WWAN radio or the WLAN radio. In certain aspects, UE 200 is capable of communicating with the different data networks via the WWAN radio and the WLAN radio The processor 204 may be configured to allocate communication of traffic to the data network among radio 214 and radio 234 based on a set of parameters, including thermal parameters, as further discussed herein.

The UE 200 may further include a thermal sensor array (not shown) comprising one or more thermal sensors. Each of the thermal sensors may be positioned in one of the described components of UE 200, on or attached to one of the described components, in another position in housing 208, or integrated into housing 208 and any position in housing 208. Examples of positioning of the one or more thermal sensors are further described with respect to FIG. 8.

The UE 200 may also include a signal detector 218 that may be used in an effort to detect and quantify the level of signals received by the transceiver 214. The signal detector 218 may detect such signals as total energy, energy per subcarrier per symbol, power spectral density and other signals. The UE 200 may also include a digital signal processor (DSP) 220 for use in processing signals.

The various components of the UE 200 may be coupled together by a bus system 222, which may include a power bus, a control signal bus, and a status signal bus in addition to a data bus.

Figure 3:
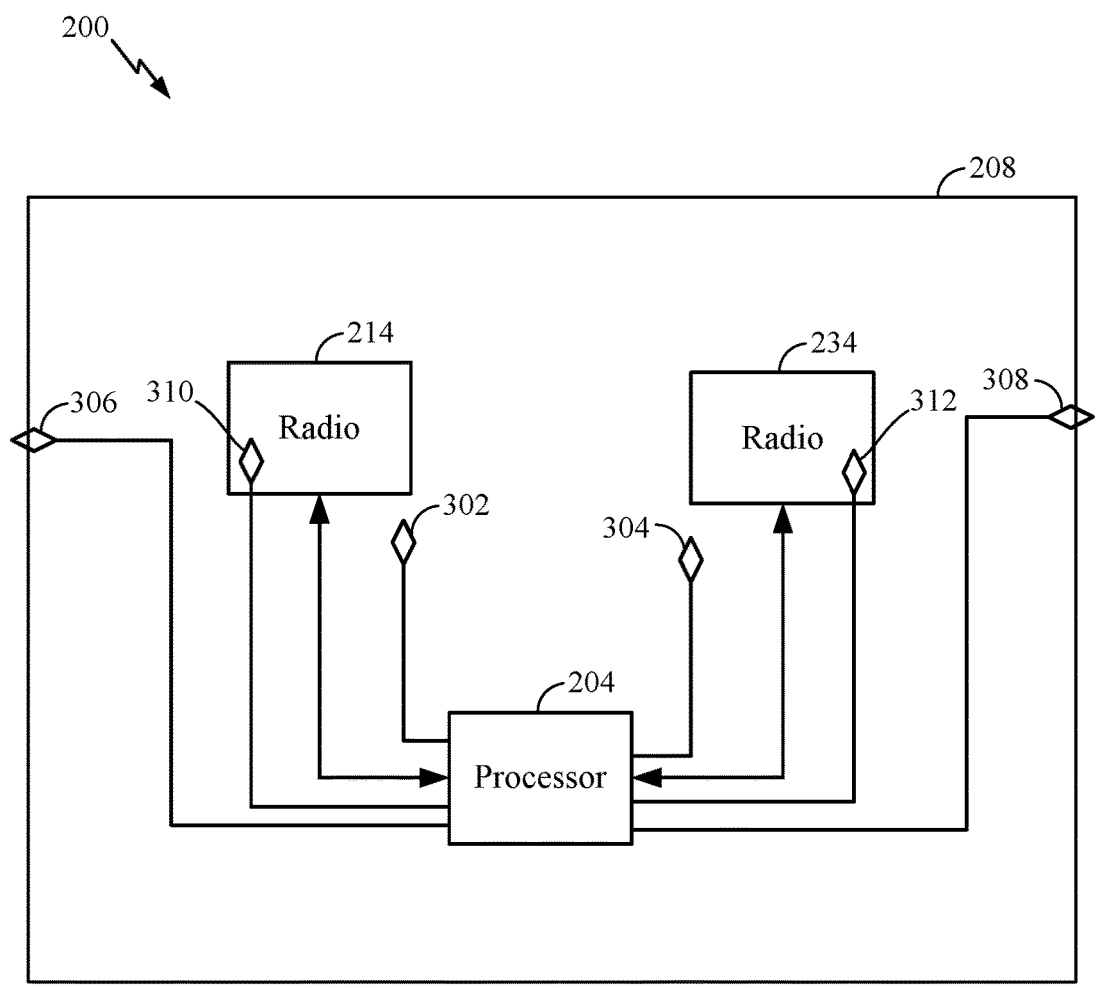
FIG. 3 is a simplified block diagram of an exemplary implementation of the user equipment (UE) of FIG. 2, in accordance with certain aspects of the present disclosure.

FIG. 3 is a simplified block diagram of an exemplary implementation of the UE 200 of FIG. 2. In particular, as discussed, the UE 200 includes a first radio 214 and a second radio 234 in example positions in a housing 208. As discussed with respect to FIG. 2, radio 214 and radio 234 may be in other positions than shown in the housing 208. The UE 200 further includes the processor 204 in the housing 208. In certain aspects, processor 204 is configured to act as a controller for radio 214 and radio 234 and control allocation of communication of traffic to a data network among radio 214 and radio 234 based on a set of thermal parameters (e.g., temperature). Accordingly, UE 200 further includes one or more thermal sensors, shown as thermal sensors 302, 304, 306, 308, 310, and 312. It should be noted that UE 200 may include additional or fewer thermal sensors and the thermal sensors may be in the same or different positions than shown.

As shown thermal sensor 302 is in housing 208 proximate to radio 214 (e.g., closer to radio 214 than radio 234), and therefore is configured to measure thermal parameters (e.g., temperature) associated with radio 214302222302302 Similarly, thermal sensor 304 is in housing 208 proximate to radio 234 and associated with radio 234. Therefore, thermal sensor 304 is configured to measure thermal parameters associated with radio 234. Such a thermal sensor located in housing 208 may be used to measure a thermal parameter in housing 208 associated with the associated radio.

Thermal sensor 306 is an example of a thermal sensor located on a surface or integrated into housing 208 proximate to radio 214 and associated with radio 214. Thermal sensor 308 is an example of a thermal sensor located on a surface or integrated into housing 208 proximate to radio 234 and associated with radio 234. Such a thermal sensor located on a surface or integrated into housing 208 may be used to measure a skin or case (e.g., housing) thermal parameter associated with the associated radio.

Thermal sensor 310 is an example of a thermal sensor integrated with, or on the surface of, radio 214. Thermal sensor 312 is an example of a thermal sensor integrated with, or on the surface of, radio 234. Such a thermal sensor located on a surface or integrated with a radio may be used to measure a junction thermal parameter associated with the radio. 222222The plurality of thermal sensors in UE 200 may form a thermal sensor array configured to generate a set of corresponding thermal parameters. In certain aspects, one or more thermal sensors may not be associated with a given radio and may instead be configured to measure a thermal parameter (e.g., skin temperature, case temperature, housing temperature, etc.) generally associated with the UE 200.

In certain aspects, thermal sensors 302-312 are coupled to processor 204, and processor 204 receives information indicative of thermal parameters from thermal sensors 302-312 as input. For example, processor 204 receives information indicative of a set of thermal parameters corresponding to thermal parameters measured by one or more thermal sensors. In certain aspects, processor 204 is further configured to utilize the information indicative of a set of thermal parameters to allocate data traffic among radios 214 and 234 for communicating with a data network. For example, in certain aspects, each of radios 214 and 234 has an associated thermal design threshold. In certain aspects, if a temperature (e.g., junction temperature) of radio 214 or 234 exceeds its thermal design threshold, data throughput of that radio may be throttled, which is undesirable. Since UE 200 can communicate with a data network through either radio 214 or radio 234, in certain aspects, processor 204 opportunistically selects which radio or radios to utilize for data traffic, such as to avoid such throttling. In certain aspects, one radio may be prioritized over another radio based on one or more non-thermal parameters such as cost, signal strength, bandwidth, etc. (e.g., radio 234 is a WLAN radio and prioritized over radio 214, a WWAN radio, based on costs).

In certain aspects, processor 204 is configured to allocate all data traffic to radio 234 (e.g., turn on radio 234 and turn off radio 214) or most data traffic (e.g., a higher percentage for radio 234) when a thermal parameter (e.g., thermal parameter value) of UE 200 generally or radio 234 is below a throttle-down threshold (e.g., a thermal design threshold associated with radio 234, a threshold based on the thermal design threshold, a threshold below the thermal design threshold, etc.). The throttle-down threshold may correspond to a throttle-down threshold value. In certain aspects, when the thermal parameter rises above the throttle-down threshold, processor 204 is configured to allocate all data traffic to radio 214 (e.g., turn on radio 214 and turn off radio 234) or most data traffic (e.g., a higher percentage for radio 214). Accordingly, radio 234 may cool down when turned off, and eventually the thermal parameter may drop below a throttle-up threshold (e.g., throttle-up threshold value). The throttle-up threshold is typically set to be below the throttle-down threshold. At that time, processor 204 may again allocate all or most data traffic to radio 234. Multiple thresholds are useful for providing hysteresis to avoid excess switching of radios. When the thermal parameter is between the throttle-down and throttle-up thresholds, processor 204 continues utilizing the current radio allocation being used for data traffic. In some implementations, the throttle-down threshold is set to be equal to the throttle-up threshold. Similarly, in some implementations, radio 234 or UE 200 generally may be associated with a single threshold for both throttling down and throttling up.

Figure 4:
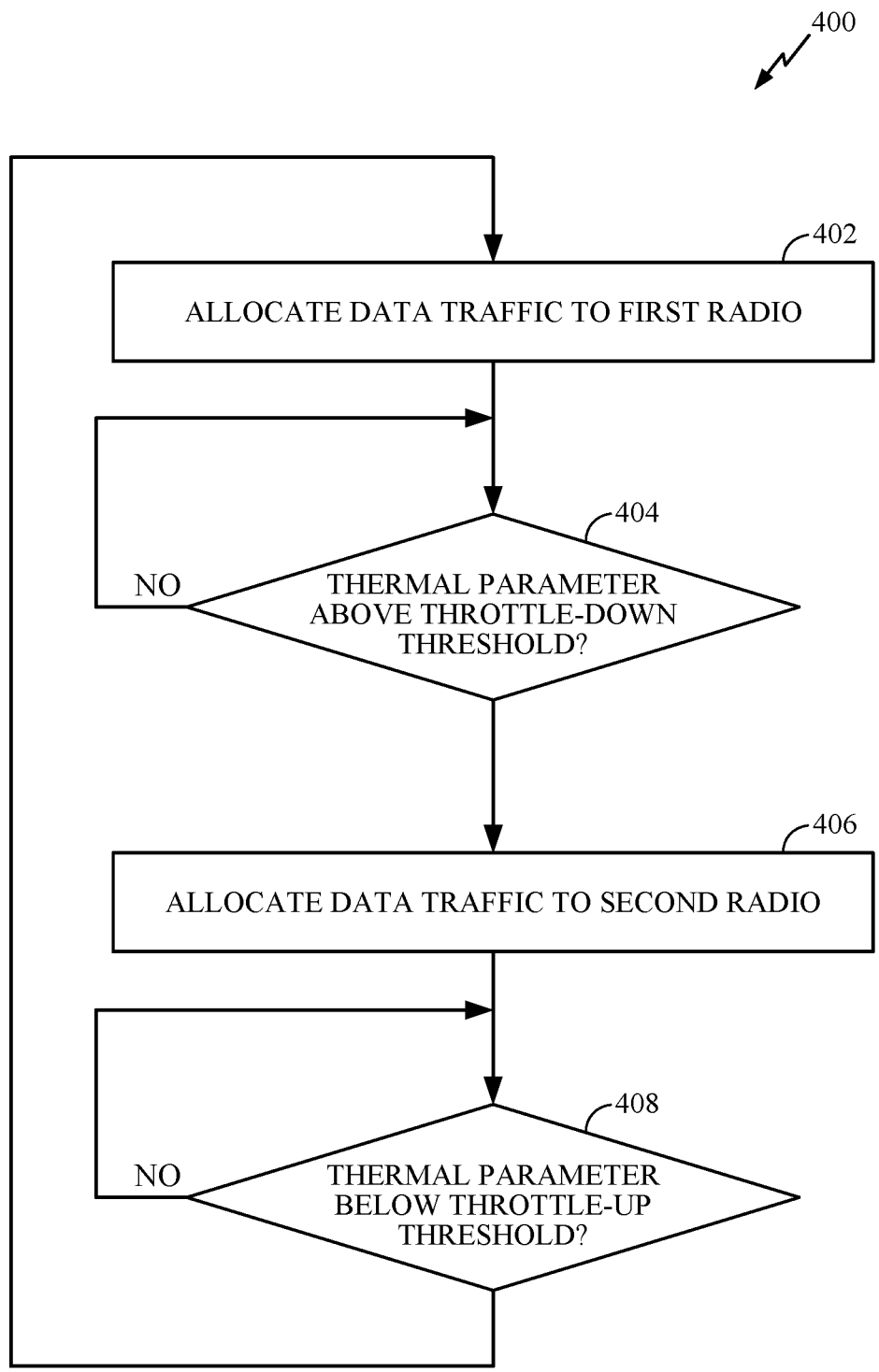
FIG. 4 illustrates example operations that may be performed by a UE to allocate communication of data traffic among radios of the UE, in accordance with certain aspects of the present disclosure.

FIG. 4. illustrates example operations 400 that may be performed by a UE (e.g., UE 200) to allocate communication of data traffic among radios of the UE (e.g., radios 214 and 234), in accordance with certain aspects of the present disclosure. At 402, processor 204 is configured to initially allocate all data traffic or most data traffic to radio 234. At 404, processor 204 determines if a thermal parameter value of radio 234 or UE 200 generally is above a throttle-down threshold value. For example, processor 204 utilizes information indicative of a thermal parameter of radio 234 received from a thermal sensor associated with radio 234 or information indicative of a thermal parameter of UE 200 generally received from a thermal sensor to make the determination. If the thermal parameter value is below the throttle-down threshold value, processor 204 continues with the current allocation of all data traffic or most data traffic to radio 234, and operations 400 return to 404. If the thermal parameter value is above the throttle-down threshold value, operations 400 continue to 406.

At 406, processor 204 allocates all data traffic or most data traffic to radio 214. At 408, processor 204 determines if the thermal parameter value is below a throttle-up threshold value. If the thermal parameter value is above the throttle-up threshold value, processor 204 continues with the current allocation of all data traffic or most data traffic to radio 214, and operations 400 return to 406. If the thermal parameter value is below the throttle-up threshold value, operations 400 return to 402, where processor 204 again allocates all data traffic or most data traffic to radio 234.

In certain aspects, processor 204 is configured to allocate data traffic among radios 214 and 234 based on thermal parameters associated with each of radios 214 and 234 (e.g., $P_{214}$ is a thermal parameter associated with radio 214 and $P_{234}$ is a thermal parameter associated with radio 234). For example, processor 204 may be configured to allocate data traffic as a function of 1) a difference between a threshold associated with radio 214 (e.g., $TH_{214}$) and information indicative of a thermal parameter $P_{214}$ associated with radio 214 (e.g., threshold value-parameter value), and 2) a difference between a threshold associated with radio 234 (e.g., $TH_{234}$) and a thermal parameter $P_{234}$ associated with radio 234 (e.g., threshold value-parameter value). For example, processor 204 may allocate a greater amount of data traffic (e.g., as a ratio of the difference associated with a radio to the sum of the differences) to the radio associated with the larger difference (e.g., the radio with a thermal parameter further below the threshold or not as high above the threshold). In other words, data traffic may be allocated as follows:

% traffic allocated to radio 234=$(TH_{234}-P_{234})/((TH_{234}-P_{234})+(TH_{214}-P_{214}))$ % traffic allocated to radio 214=$(TH_{214}-P_{214})/((TH_{234}-P_{234})+(TH_{214}-P_{214}))$ In certain aspects, processor 204 is configured to allocate all or most data traffic to radio 234 when a thermal parameter value of radio 234 is below a threshold value associated with radio 234, or when the thermal parameter value of radio 234 is lower than a thermal parameter value of radio 214. Further, processor 204 is configured to allocate all or most data traffic to radio 214 when the thermal parameter value of radio 234 is above the threshold value associated with radio 234 and the thermal parameter value of radio 214 is lower than the thermal parameter value of radio 234. Accordingly, radio 234 may be favored for communicating data traffic so long as it is operating below its associated threshold and the temperature of radio 234 is less than the temperature of radio 214.

In certain aspects, processor 204 is configured to allocate all or most data traffic to radio 234 when a thermal parameter value of radio 234 is lower than a thermal parameter value of radio 214. Further, processor 204 is configured to allocate all or most data traffic to radio 214 when a thermal parameter value of radio 214 is lower than a thermal parameter value of radio 234.

In certain aspects, processor 204 is configured to switch allocation of all or most data traffic from radio 234 to radio 214 when a thermal parameter value of radio 234 is above a threshold value associated with radio 234 and a thermal parameter value of radio 214 is below a threshold value associated with radio 214. For example, if radio 234 is currently allocated all or most data traffic and is too hot, but radio 214 is not too hot, then allocation of all or most data traffic switches to radio 214 from radio 234. Further, processor 204 is configured to continue the allocation of all or most data traffic to radio 214 when the thermal parameter value of radio 214 is below the threshold value associated with radio 214 or when the thermal parameter value of radio 234 is above the threshold value associated with radio 234 and the thermal parameter value of radio 214 is above the threshold value associated with radio 214. For example, if radio 214 is currently allocated all or most data traffic and is not too hot it continues to be allocated all or most data traffic. Further, if radio 214 is currently allocated all or most data traffic and both radio 214 and radio 234 are too hot, radio 214 continues to be allocated all or most data traffic. Additionally, processor 204 is configured to switch allocation of all or most data traffic from radio 214 to radio 234 when a thermal parameter value of radio 214 is above a threshold associated with radio 214 and a thermal parameter value of radio 234 is below a threshold value associated with radio 234. For example, if radio 214 is currently allocated all or most data traffic and is too hot, but radio 234 is not too hot, then allocation of all or most data traffic switches to radio 234 from radio 214. Further, processor 204 is configured to continue the allocation of all or most data traffic to radio 234 when the thermal parameter value of radio 234 is below the threshold value associated with radio 234 or when the thermal parameter value of radio 234 is above the threshold value associated with radio 234 and the thermal parameter value of radio 214 is above the threshold value associated with radio 214. For example, if radio 234 is currently allocated all or most data traffic and is not too hot it continues to be allocated all or most data traffic. Further, if radio 234 is currently allocated all or most data traffic and both radio 214 and radio 234 are too hot, radio 234 continues to be allocated all or most data traffic.

In certain aspects, such as to provide hysteresis, each of radio 234 and radio 214 may be associated with multiple thresholds for determining allocation of data traffic among radios 234 and 214. For example, in certain aspects, radio 234 is associated with a throttle-up threshold and a throttle-down threshold, where the throttle-up threshold is lower than the throttle-down threshold. Further, radio 214 is associated with a third threshold. In certain aspects, processor 204 is configured to allocate all or most data traffic initially to radio 234. Further, processor 204 is configured to continue to allocate all or most data traffic to radio 234 until a thermal parameter value associated with radio 234 is above the throttle-down threshold value and a thermal parameter value associated with radio 214 is below the third threshold value, and then switch allocation of all or most data traffic to radio 214. Processor 204 is configured to continue to allocate all or most data traffic to radio 214 until the thermal parameter value associated with radio 234 is below the throttle-up threshold, and then switch allocation of all or most data traffic to radio 234. In certain aspects, the third threshold equals one of the throttle-up and throttle-down thresholds.

In certain aspects, such as any of the aspects described, if both the thermal parameter of radio 234 is above a threshold associated with radio 234 and the thermal parameter of radio 214 is above a threshold associated with radio 214, processor 204 may control UE 200 to not communicate via either of radio 214 or 234. In certain aspects, such as any of the aspects described, the thresholds associated with different radios are the same. In certain aspects, such as any of the aspects described, the thresholds associated with different radios are different.

Figure 5:
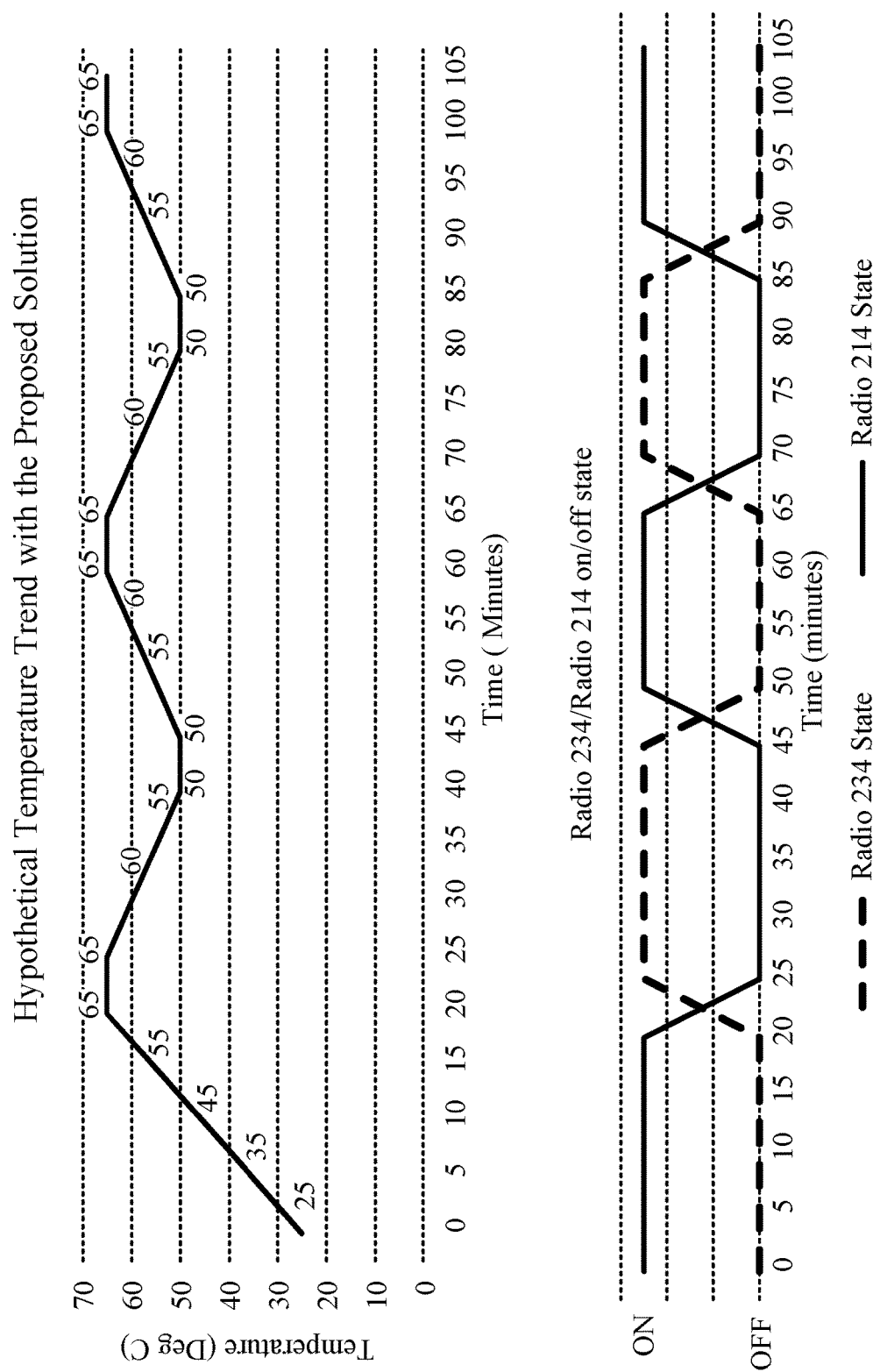
FIG. 5 is an exemplary graph correlating a first temperature to the allocation of data traffic among radios of a UE, in accordance with certain aspects of the present disclosure.

FIG. 5 is an exemplary graph correlating a first temperature to the switching on and off of radios 214 and 234. As shown, in the bottom section, radio 234 is initially switched on, such as to allocate all or more data traffic to radio 234, while radio 214 is initially switched off. The first temperature, as shown in the upper section, increases as radio 234 operates. At around 20 minutes, the first temperature exceeds a throttle-down threshold of 65 degrees and, consequently, as shown in the lower section, radio 234 is switched off and radio 214 is switched on, such as to allocate all or more data traffic to radio 214. Accordingly, the first temperature stabilizes and then decreases, as shown in the upper section. At around 45 minutes, the first temperature falls below a throttle-up threshold of 50 degrees and, consequently, as shown in the lower section, radio 214 is switched off, and radio 234 is switched on, such as to allocate all or more data traffic to radio 234. Accordingly, the first temperature begins to increase as shown in the upper section. Accordingly, switching between radios, such as based on thresholds, can effectively control temperature, as shown.

Figure 6:
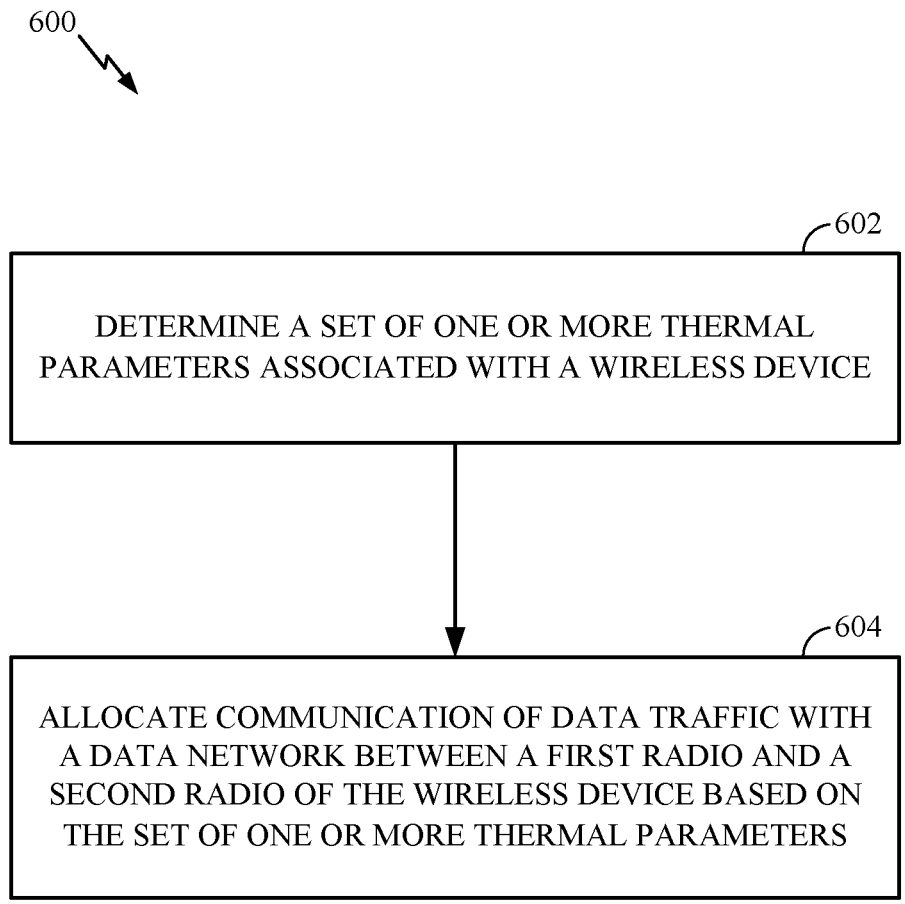
FIG. 6 illustrates example operations that may be performed by a UE to allocate communication of data traffic among a plurality of radios of the UE, in accordance with certain aspects of the present disclosure.

FIG. 6 illustrates example operations 600 that may be performed by a UE to allocate communication of data traffic among a plurality of radios of the UE, in accordance with certain aspects of the present disclosure. In some instances, the UE may correspond to a user equipment 102 or 200, described above with respect to FIGS. 1, 2, and 3. Operations 600 begin, at 602, by the UE determining a set of one or more thermal parameters associated with the UE. At 604, the UE allocates communication of data traffic with a data network between a first radio and a second radio of the UE based on the set of one or more thermal parameters. In other words, the UE determines the allocation of data traffic between the first and second radios as a function of the set of one or more thermal parameters.

Certain aspects are discussed with respect to allocating communication of data traffic with a data network between radios of a UE based on thermal parameters associated with the radios or the UE generally. As discussed, each radio or the UE generally may be associated with more than one thermal parameter (e.g., temperature in housing, junction temperature, skin/case temperature, etc.). In certain aspects, multiple thermal parameters associated with a radio or the UE generally may be used to determine an overall thermal parameter associated with the radio or UE generally. Accordingly, the overall thermal parameters may be used as the thermal parameters for allocating communication of data traffic with a data network between radios of the UE in the various described aspects. An overall thermal parameter may be calculated as an average function, maximum function, median, or some other suitable function of multiple thermal parameters.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A wireless device comprising:
   a first radio configured to communicate with a first data network;
   a second radio configured to communicate with a second data network;
   a thermal sensor array configured to measure a set of one or more thermal parameters associated with the wireless device; and
   a controller configured to allocate communication of data traffic between the first radio and the second radio based on the set of one or more thermal parameters, wherein to allocate communication of data traffic between the first radio and the second radio comprises to:
      allocate more data traffic to the first radio when a first thermal parameter of the set of one or more thermal parameters associated with the first radio is below a first threshold or when the first thermal parameter is less than a second thermal parameter of the set of one or more thermal parameters associated with the second radio; and
      allocate more data traffic to the second radio when the second thermal parameter is less than the first thermal parameter and the first thermal parameter is above the first threshold.

2. The wireless device of claim 1, wherein the first data network and the second data network are the same data network, and wherein the controller is configured to allocate communication of data traffic with the data network between the first radio and the second radio based on the set of one or more thermal parameters.

3. The wireless device of claim 1, wherein at least one of the set of one or more thermal parameters is a function of one or more of a junction temperature, a skin temperature, or a radio temperature associated with one or more of the wireless device, the first radio, or the second radio.

4. The wireless device of claim 1, wherein the first radio is positioned in a location different from the location of the second radio in the wireless device, wherein a first thermal sensor of the thermal sensor array is located closer to the first radio than the second radio, and a second thermal sensor of the thermal sensor array is located closer to the second radio than the first radio.

5. The wireless device of claim 1, wherein a first thermal sensor of the thermal sensor array is at least one of embedded in the first radio or located on a housing of the wireless device.

6. The wireless device of claim 1, wherein the first radio is configured to communicate with the first data network using a first radio technology, and wherein the second radio is configured to communicate with the second data network using a second radio technology that is different than the first radio technology.

7. The wireless device of claim 6, wherein the first radio technology comprises a wireless local area network technology and the second radio technology comprises a wireless wide area network technology.

8. The wireless device of claim 1, wherein to allocate communication of data traffic between the first radio and the second radio comprises to selectively turn on and off the first radio and the second radio.

9. A method for a wireless device for communicating in one or more data networks, the method comprising:
   determining, by the wireless device, a set of one or more thermal parameters associated with the wireless device; and
   allocating communication of data traffic between a first radio and a second radio of the wireless device, by the wireless device, based on the set of one or more thermal parameters wherein allocating communication of data traffic between the first radio and the second radio comprises:
      allocating more data traffic to the first radio when a first thermal parameter of the set of one or more thermal parameters associated with the first radio is below a first threshold or when the first thermal parameter is less than a second thermal parameter of the set of one or more thermal parameters associated with the second radio; and
      allocating more data traffic to the second radio when the second thermal parameter is less than the first thermal parameter and the first thermal parameter is above the first threshold.

10. The method of claim 9, wherein allocating communication of data traffic comprises allocating communication of data traffic with a data network between the first radio and the second radio.

11. The method of claim 9, wherein at least one of the set of one or more thermal parameters is a function of one or more of a junction temperature, a skin temperature, or a radio temperature associated with one or more of the wireless device, the first radio, or the second radio.

12. A method for a wireless device for communicating in one or more data networks, the method comprising:
   determining, by the wireless device, a set of one or more thermal parameters associated with the wireless device; and
   allocating communication of data traffic between a first radio and a second radio of the wireless device, by the wireless device, based on the set of one or more thermal parameters, wherein allocating communication of data traffic between the first radio and the second radio comprises:
      switching from allocating more data traffic to the first radio to allocating more data traffic to the second radio when a first thermal parameter of the set of one or more thermal parameters associated with the first radio is above a first threshold and a second thermal parameter of the set of one or more thermal parameters associated with the second radio is below a second threshold;
      continuing allocating more data traffic to the first radio when the first thermal parameter is below the first threshold or when the first thermal parameter is above the first threshold and the second thermal parameter is above the second threshold;
      switching from allocating more data traffic to the second radio to allocating more data traffic to the first radio when the second thermal parameter is above the second threshold and the first thermal parameter is below the first threshold; and
      continuing allocating more data traffic to the second radio when the second thermal parameter is below the second threshold or when the first thermal parameter is above the first threshold and the second thermal parameter is above the second threshold.

13. A method for a wireless device for communicating in one or more data networks, the method comprising:
   determining, by the wireless device, a set of one or more thermal parameters associated with the wireless device; and
   allocating communication of data traffic between a first radio and a second radio of the wireless device, by the wireless device, based on the set of one or more thermal parameters, wherein allocating communication of data traffic between the first radio and the second radio comprises:
      allocating more data traffic to the first radio when a first thermal parameter of the set of one or more thermal parameters associated with the first radio is below a second thermal parameter of the set of one or more thermal parameters associated with the second radio; and
      allocating more data traffic to the second radio when the second thermal parameter is below the first thermal parameter.

14. The method of claim 9, wherein allocating communication of data traffic between the first radio and the second radio comprises:
   not communicating via the first radio or the second radio when at least one of the set of one or more thermal parameters is above a threshold.

15. A method for a wireless device for communicating in one or more data networks, the method comprising:
   determining, by the wireless device, a set of one or more thermal parameters associated with the wireless device; and
   allocating communication of data traffic between a first radio and a second radio of the wireless device, by the wireless device, based on the set of one or more thermal parameters, wherein a first threshold and a second threshold higher than the first threshold are associated with the first radio, wherein a third threshold is associated with the second radio, and wherein allocating communication of data traffic between the first radio and the second radio comprises:

initially allocating more data traffic to the first radio;

switching to allocating more data traffic to the second radio when a first thermal parameter of the set of one or more thermal parameters associated with the first radio is above the second threshold and a second thermal parameter of the set of one or more thermal parameters associated with the second radio is below the third threshold; and switching to allocating more data traffic to the first radio when the first thermal parameter is below the first threshold.

* * * * *